United States Patent [19]
Brams et al.

[11] Patent Number: 5,736,169
[45] Date of Patent: Apr. 7, 1998

[54] CLOSING APPARATUS FOR MULTIPLE-MOLD INJECTION-MOLDING SYSTEM

[75] Inventors: Peter Brams, Munich; Werner Mandl, Unterzeitlbach, both of Germany

[73] Assignee: Krauss-Maffei AG, Munich, Germany

[21] Appl. No.: 566,784

[22] Filed: Dec. 4, 1995

[30] Foreign Application Priority Data

Dec. 8, 1994 [DE] Germany ............... 44 43 689.0

[51] Int. Cl.⁶ .................................................. B29C 45/66
[52] U.S. Cl. .................. 425/450.1; 425/451.9; 425/588; 425/589
[58] Field of Search ............................ 425/589, 564, 425/125, 450.1, 451.9, 588, 594, 595

[56] References Cited

U.S. PATENT DOCUMENTS

| | | | |
|---|---|---|---|
| 5,007,822 | 4/1991 | Hara et al. | 425/588 |
| 5,110,283 | 5/1992 | Bluml et al. | 425/589 |
| 5,145,353 | 9/1992 | Zakich | 425/589 |
| 5,332,385 | 7/1994 | Leonhartsberger | 425/589 |
| 5,352,394 | 10/1994 | Fujita et al. | 425/589 |

FOREIGN PATENT DOCUMENTS

| | | | |
|---|---|---|---|
| 0 459 947 | 12/1991 | European Pat. Off. | |
| 1 109 356 | 6/1961 | Germany. | |
| 1 576 162 | 6/1970 | Germany. | |
| 1957052 | 5/1971 | Germany. | |
| 37 18 106 | 5/1991 | Germany. | |
| 93 20 508 | 10/1994 | Germany. | |
| 56 58841 | 5/1981 | Japan. | |
| JA-0152832 | 8/1984 | Japan | 425/589 |
| 60 247522 | 12/1985 | Japan. | |
| 61 29515 | 2/1986 | Japan. | |
| 62 121023 | 2/1987 | Japan. | |
| JO-2305615 | 12/1990 | Japan | 425/589 |
| 4-208422 | 7/1992 | Japan. | |
| JP-405104564 | 4/1993 | Japan | 425/589 |
| JP-405337977 | 12/1993 | Japan | 425/594 |
| 88 09256 | 12/1988 | WIPO. | |
| 97 17977 | 8/1994 | WIPO. | |

*Primary Examiner*—Jay H. Woo
*Assistant Examiner*—Minh-Chan T. Pham
*Attorney, Agent, or Firm*—Herbert Dubno; Andrew Wilford

[57] ABSTRACT

An injection-molding apparatus has a housing, a plate fixed on the housing, a plurality of fixed mold halves on the fixed plate, a plate movable along an axis toward and away from the fixed plate and supported on the housing without tie rods, respective movable mold halves on the movable plate engageable with the fixed mold halves, and an actuator rod passing axially through the fixed plate between the fixed mold halves and having an outer end fixed to the movable plate and an opposite inner end. An actuator fixed to the housing and to the inner rod end displaces the movable mold plate and the movable mold halves axially toward and away from the fixed mold plate and fixed mold halves.

13 Claims, 6 Drawing Sheets

CLOSING APPARATUS FOR MULTIPLE-MOLD INJECTION-MOLDING SYSTEM

SPECIFICATION

FIELD OF THE INVENTION

The present invention relates to an injection-molding system. More particularly this invention concerns a closing apparatus for an injection molder that has a plurality of molds.

BACKGROUND OF THE INVENTION

A standard injection-molding apparatus has a housing, a plate fixed on the housing, a plurality of fixed mold halves on the fixed plate, a plate movable along an axis toward and away from the fixed plate, and respective movable mold halves on the movable plate engageable with the fixed mold halves. Normally the movable plate rides on several fixed axially extending tie rods that guide it and maintain it parallel to the fixed plate. An actuator is braced between the housing and the movable mold plate to displace the movable mold plate and the movable mold halves axially toward and away from the fixed mold plate and fixed mold halves. When the mold halves are fitted together an injector can introduce a plastified synthetic resin into the cavities defined by the molds in the manner well known in the art. Such systems are described in Japanese 4,208,422 of Ihara, Japanese 61-29515 of Aoki, and German 9,320,508.

In German 3,718,106 the movable mold plate rides on a linear roller guided on the housing and is displaced by two ball-type spindles against the fixed mold plate. With this arrangement maintaining parallelism is difficult, and the equipment is quite complex.

In another known system described in German 1,576,162 of Schiffer a single annular mold is closed by means of an actuator rod that engages centrally through it. Such a system is only applicable to limited molding tasks and in particular cannot be used for arrangements intended to simultaneously produce a plurality of workpieces.

OBJECTS OF THE INVENTION

It is therefore an object of the present invention to provide an improved injection-molding apparatus.

Another object is the provision of such an improved injection-molding apparatus which overcomes the above-given disadvantages, that is which has an improved closing system that is simple, operates surely, and allows multiple workpieces to be formed in one operation.

SUMMARY OF THE INVENTION

An injection-molding apparatus has according to the invention a housing, a plate fixed on the housing, a plurality of fixed mold halves on the fixed plate, a plate movable along an axis toward and away from the fixed plate and supported on the housing without tie rods, respective movable mold halves on the movable plate engageable with the fixed mold halves, and an actuator rod passing axially through the fixed plate between the fixed mold halves and having an outer end fixed to the movable plate and an opposite inner end. An actuator fixed to the housing and to the inner rod end displaces the movable mold plate and the movable mold halves axially toward and away from the fixed mold plate and fixed mold halves.

The system of this invention allows the simultaneous production of several different workpieces, e.g. compact disks, which may be of the same or different size and/or shape. If only one workpiece is to be manufactured at a time, the other mold halves can be replaced by spacer blocks. The elimination of the tie rods makes it particularly easy to demold finished articles and get to the molds to change or service them.

The actuator according to the invention is a hydraulic ram having a piston rod constituting the actuator rod. The movable plate and movable mold halves together have a center of mass and the outer rod end is attached to the movable plate at the center of mass. This creates a self-aligning action that completely eliminates the need for any other alignment aids.

The movable mold plate in accordance with this invention can be a turntable pivotal about the axis so that each movable mold half can be fitted with each fixed mold half. Such an arrangement is particularly useful for making compact disks.

The housing of the inventive system is formed with a guide and the movable plate has an edge riding on the guide. The guide can be a linear roller bearing with a built-in position sensor. It can also be an axially extending rail on the housing.

The axis of this system can be horizontal and the plates are vertical or it can be vertical and the plates horizontal. In the latter case the fixed plate is circular and beneath the movable plate. Either way sensors are provided on at least one of the plates for generating an output when the respective mold halves are fitted to the mold halves of the other plate. These sensors are connected to a controller which only allows an extruder to inject resin into the mold cavities when it determines that all molds are closed.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
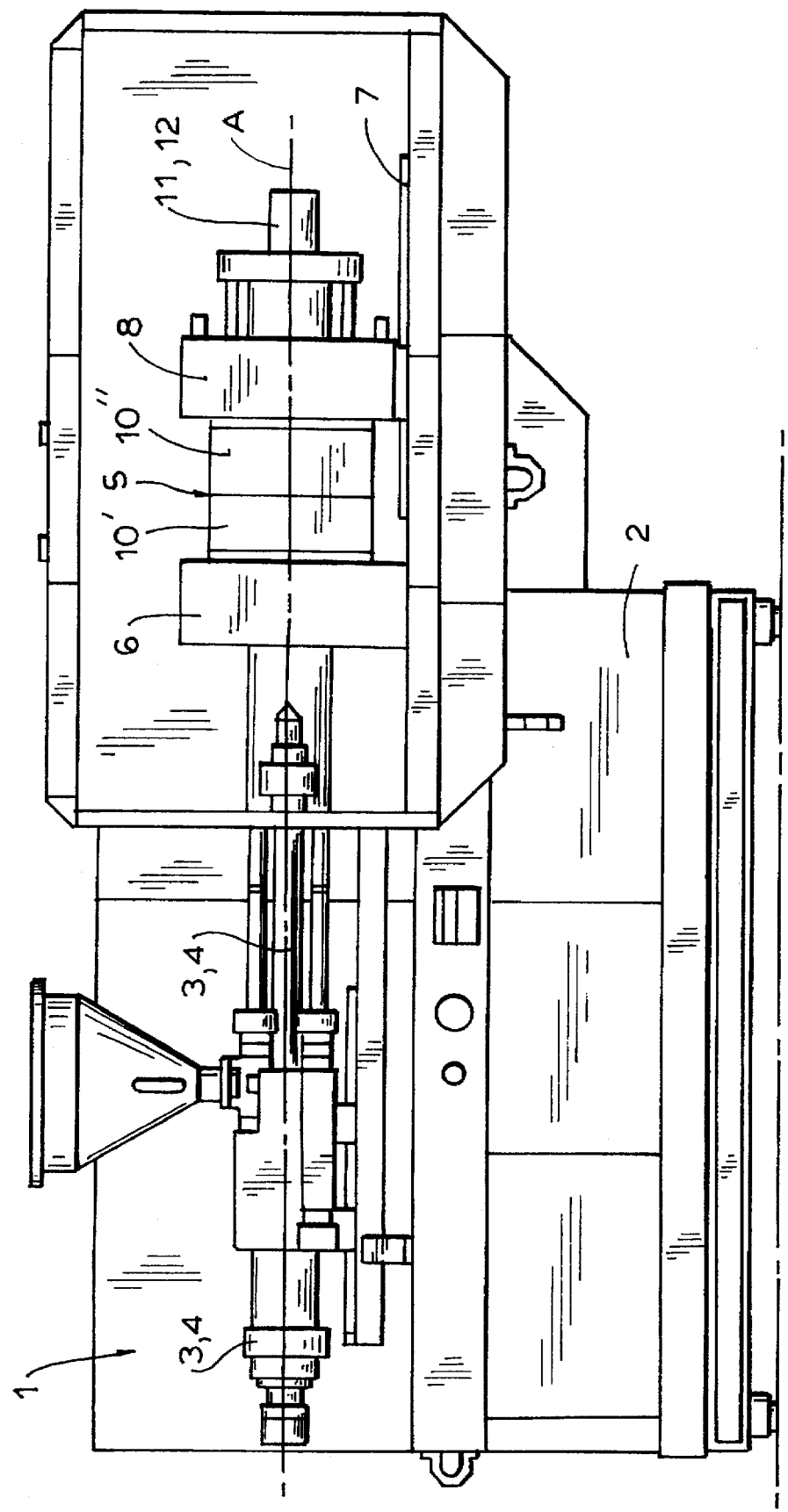
FIG. 1 is a partly schematic side view illustrating the injection molder according to the invention.
Figure 2:
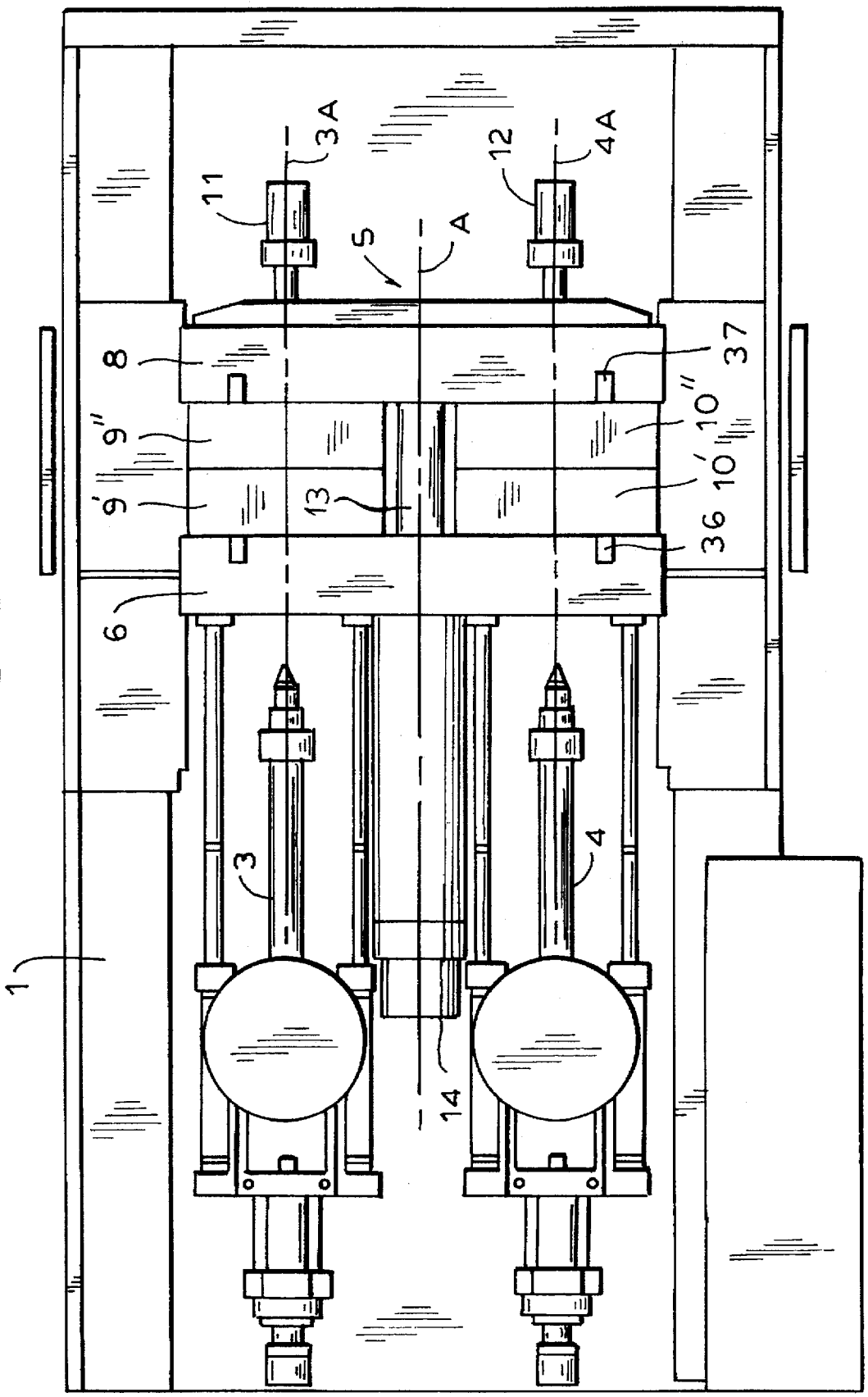
FIG. 2 is a top view of the FIG. 1 molder.

As seen in FIGS. 1 and 2 an injection molding machine 1 according to the invention has a housing 2 on which are carried a pair of identical injectors 3 and 4 centered on respective axes 3A and 4A symmetrically and horizontally flanking a center machine axis A. A mold assembly 5 comprises a mold support plate 6 fixed on the housing 2 and engageable with the injectors 3 and 4 and a mold-support plate 8 that can move along the axis A on a guide 7 on the machine housing 1. No tie rods are provided to guide the movable mold support plate 8.

The fixed plate 6 supports a pair of fixed mold halves 9' and 10' and the movable plate 8 two movable mold halves 9" and 10". The mold halves 9', 9" or their centers of mass are centered on the axis 3A and the halves 10', and 10" on the axis 4A. Respective ejectors 11 and 12 are provided on the plate 8 for demolding finished articles. Sensors 36 and 37 are provided to ensure that there are mold parts on the plates 6 and 8 before the molds are closed.

According to the invention the movable mold plate 8 and the mold halves 9" and 10" are displaced axially by a hydraulic ram 14 secured on the housing 1 between the injectors 3 and 4 and having a piston rod 13 extending along the axis A through the fixed support plate 6 to the movable plate 8 where it is attached. Contraction of this ram 14 will pull in the piston rod 13 and pull the plate 8 in to seat the movable mold halves 9" and 10" on the fixed mold halves 9' and 10' mounted on the fixed plate 6.

Figure 3:
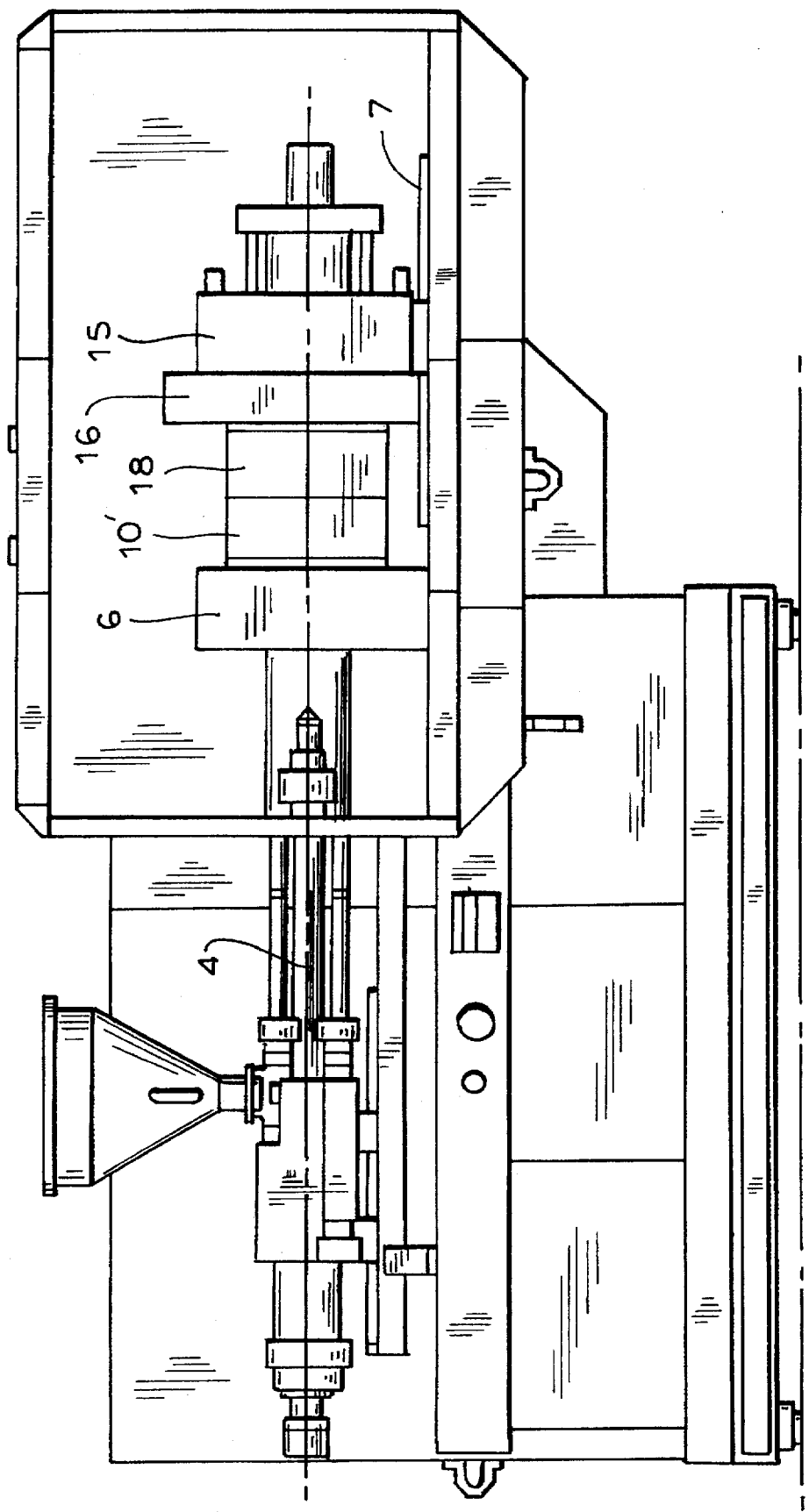
FIG. 3 is a view like FIG. 1 of a molder with a turntable mount for its molds.
Figure 4:
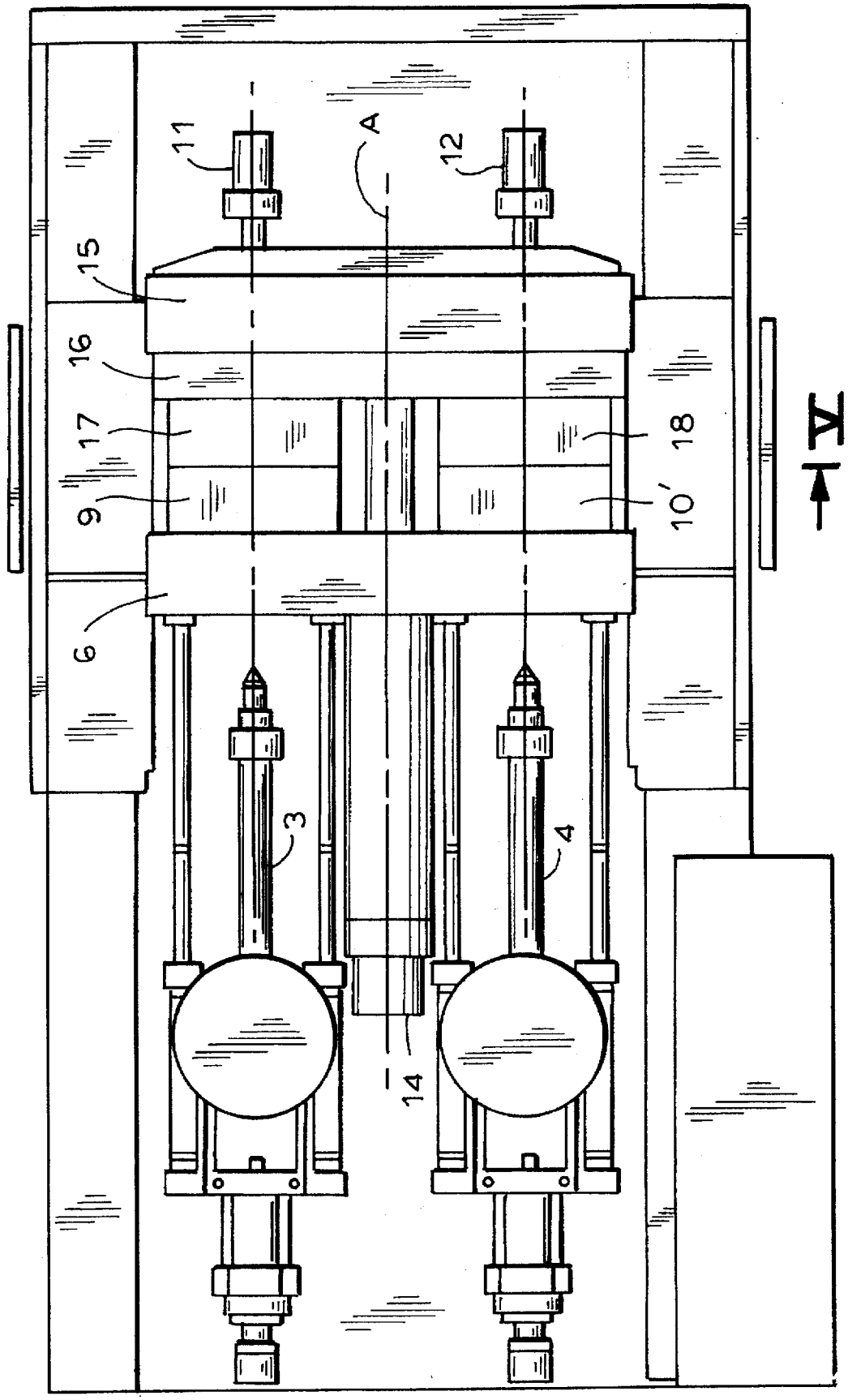
FIG. 4 is a top view of the FIG. 2 molder.
Figure 5:
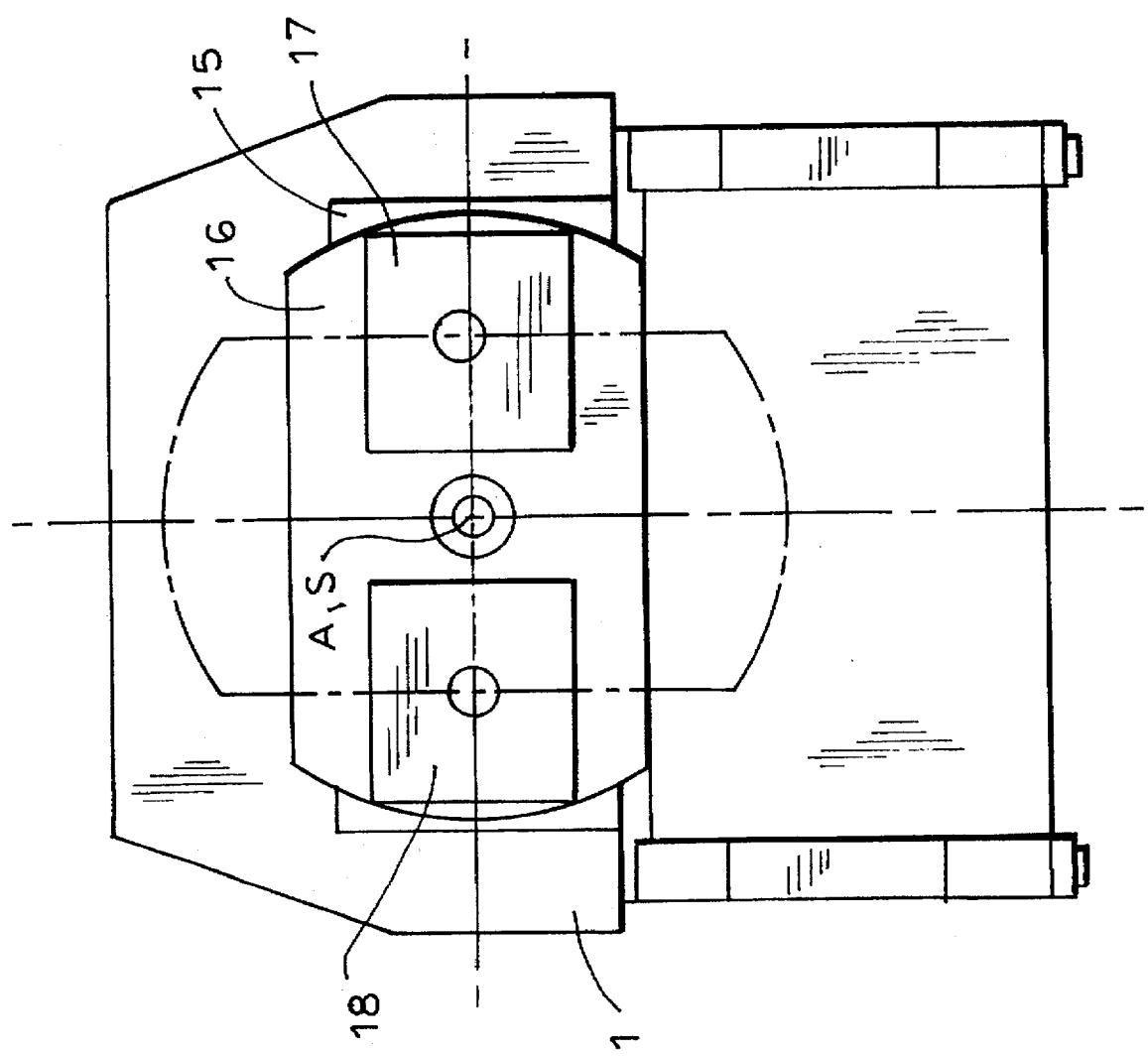
FIG. 5 is a section taken along line V—V of FIG. 4.

In the arrangement of FIGS. 3 through 5 a movable plate 15 carries a turntable 16 carrying a pair of movable mold halves 17 and 18, replacing the plate 8 and mold halves 9" and 10" of FIGS. 1 and 2. This turntable 16 rotates about the axis A which corresponds to the center S of mass of it and the two mold halves 17 and 18.

Figure 6:
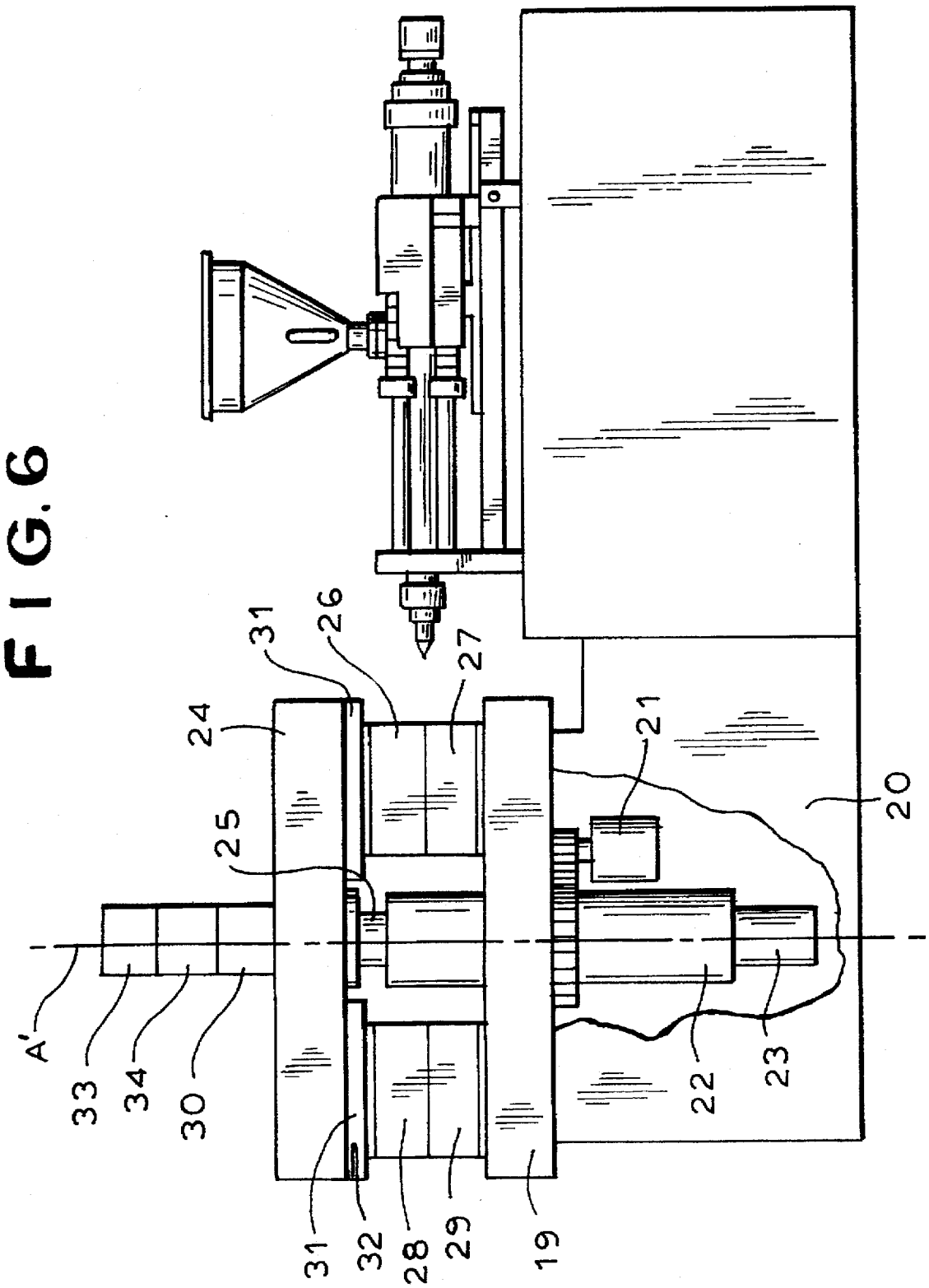
FIG. 6 is a small-scale side view of another molder according to the invention.

FIG. 6 shows a system having a fixed mold plate 19 that is horizontal and mounted on a housing 20 and that supports a pair of fixed mold halves 27 and 29. A movable mold half 24 above the plate 19 can be rotated about a center vertical axis A' by a motor 21, and carries a pair of movable mold halves 26 and 28. A hydraulic cylinder 22 with a force multiplier 23 has a central piston rod 25 connected to the plate 24 to displace the movable mold support plate 24 along the axis A'. Force distributors 31 are provided between the mold halves 26 and 28 and the plate 24 as well as pressure sensors 32. Rotary distributors or manifolds 30, 33, and 34 are provided on the rotatable mold plate 24 for feeding in compressed air, water, and electricity.

We claim:

1. An injection-molding apparatus comprising:

a housing;

a plate fixed on the housing;

a plurality of fixed mold halves on the fixed plate;

a plate movable along an axis inwardly toward and outwardly away from the fixed plate and supported on the housing without tie rods;

respective movable mold halves on the movable plate engageable on inward movement of the movable plate with the fixed mold halves, the fixed and movable mold halves symmetrically flanking the axis;

an actuator rod passing along the axis through the fixed plate between the fixed mold halves and having an outer end fixed at the axis to the movable plate and an opposite inner end, the fixed mold plate lying between the inner and outer rod ends; and means including an actuator fixed to the housing at the axis and to the inner rod end and braced outwardly against the fixed mold plate for displacing the movable mold plate and the movable mold halves axially toward and away from the fixed mold plate and fixed mold halves, the fixed mold plate lying between the actuator and the fixed mold half.

2. The injection-molding apparatus defined in claim 1 wherein the actuator is a hydraulic ram having a piston rod constituting the actuator rod.

3. An injection-molding apparatus comprising:

a housing;

a plate fixed on the housing;

a plurality of fixed mold halves on the fixed plate;

a plate movable along an axis toward and away from the fixed plate and supported on the housing without tie rods;

respective movable mold halves on the movable plate engageable with the fixed mold halves, the fixed and movable mold halves symmetrically flanking the axis;

an actuator rod passing along the axis through the fixed plate between the fixed mold halves and having an outer end fixed at the axis to the movable plate and an opposite inner end; and means including an actuator fixed to the housing at the axis and to the inner rod end for displacing the movable mold plate and the movable mold halves axially toward and away from the fixed mold plate and fixed mold halves, the movable plate and movable mold halves together having a center of mass and the outer rod end being attached to the movable plate at the center of mass.

4. The injection-molding apparatus defined in claim 1 wherein the movable mold plate is pivotal about the axis, whereby each movable mold half can be fitted with each fixed mold half.

5. The injection-molding apparatus defined in claim 1 wherein the housing is formed with an axially extending guide and the movable plate has an edge riding on the guide.

6. The injection-molding apparatus defined in claim 5 wherein the guide is an axially extending rail on the housing.

7. The injection-molding apparatus defined in claim 5 wherein the guide includes a roller track.

8. The injection-molding apparatus defined in claim 1 wherein the axis is horizontal and the plates are vertical.

9. The injection-molding apparatus defined in claim 1 wherein the axis is vertical and the plates are horizontal.

10. The injection-molding apparatus defined in claim 9 wherein the fixed plate is circular and beneath the movable plate.

11. The injection-molding apparatus defined in claim 1, further comprising sensors on at least one of the plates for generating an output when the respective mold halves are fitted to the mold halves of the other plate.

12. The injection-molding machine apparatus defined in claim 1 wherein the fixed mold plate has an outer face carrying the fixed mold half and an inner face turned toward the actuator and extruder and the movable mold plate has an inner face carrying the movable mold half and turned toward the outer face of the fixed mold plate.

13. The injection-molding machine apparatus defined in claim 1, further comprising an extruder on the housing engageable through the fixed mold plate with the fixed mold half, the fixed mold plate lying between the extruder and the fixed mold half.

* * * * *